Patented Feb. 26, 1924.                                                                   1,484,738

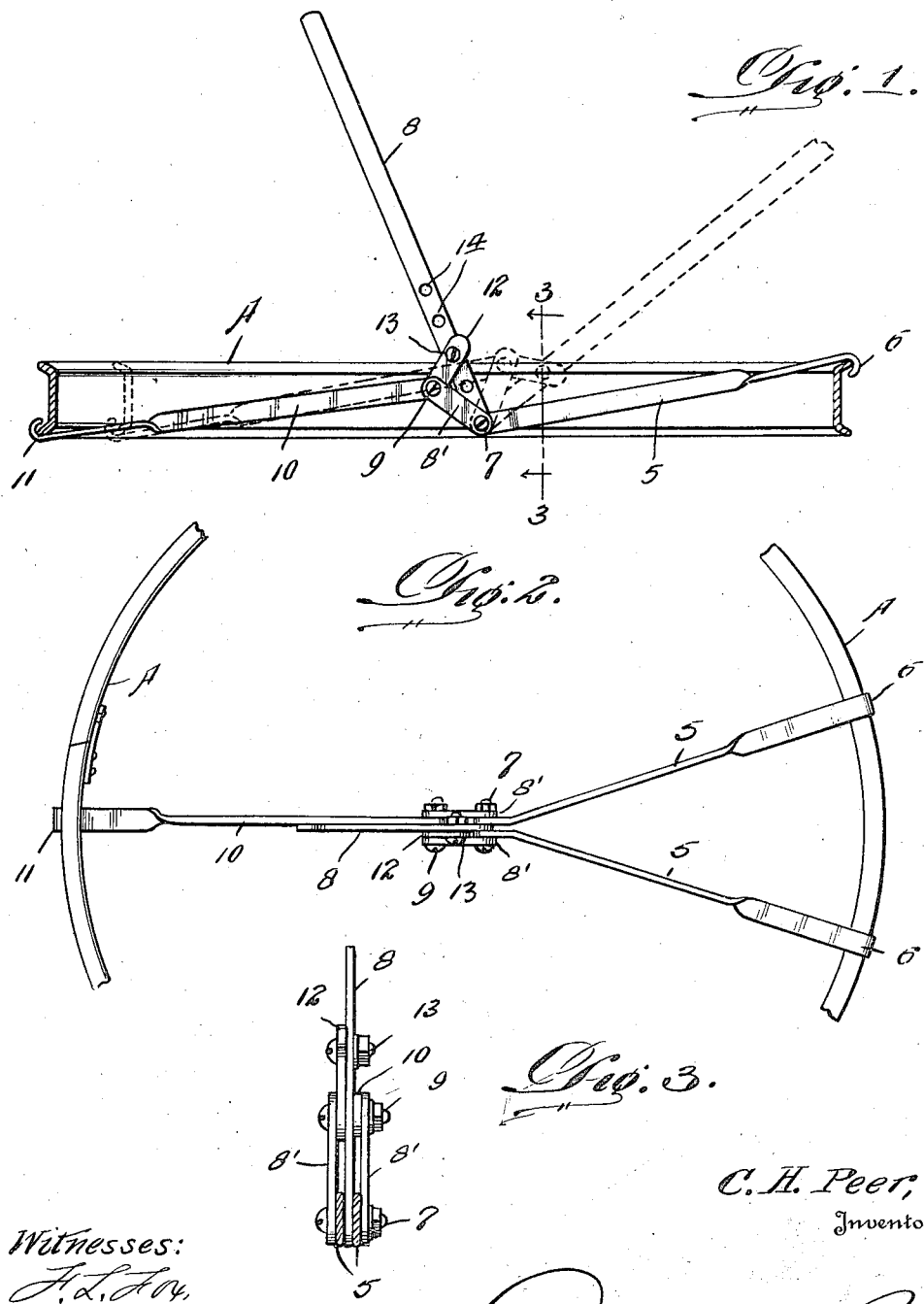

UNITED STATES PATENT OFFICE.

CHARLES H. PEER, OF DENVILLE, NEW JERSEY.

TIRE-RIM TOOL.

Application filed January 17, 1923. Serial No. 613,121.

*To all whom it may concern:*

Be it known that I, CHARLES H. PEER, a citizen of the United States, residing at Denville, in the county of Morris and State of New Jersey, have invented certain new and useful Improvements in Tire-Rim Tools, of which the following is a specification.

The primary object of my invention resides in the provision of an improved form of tire rim tool adapted primarily for contracting the split type of tire rim, so as to facilitate the easy removal of the tire therefrom.

A further object of the invention is to provide such a tire tool that is of comparatively simple construction, embodying relatively few parts, and these so corelated as to properly function with each other, when the device is being used for the purpose intended.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and where-in:—

Figure 1 is an elevational view of one side of the tire rim tool constructed in accordance with the present invention, the same being shown as positioned upon a rim to be actuated for contracting this rim.

Figure 2 is a top plan view thereof, and

Figure 3 is a vertical cross sectional view upon the line 3—3 of Figure 1, and looking forwardly in the direction of the arrows.

Having specific reference to the drawings, my tire rim contracting tool is shown as constituting a pair of parallel arm members 5 converging away from each other towards their outer free ends, and being hooked as at 6 upon these outer free ends. The inner ends of these arm members 5 are pivotally secured as at 7 to the extreme lower end of a hand lever 8.

Upon the outer side of each of the arm members 5, and carried by the pivot 7 is the lower end of a link 8'. Between the upper ends of each of these links 8', there is pivotally secured as at 9 another arm member 10, which extends upon the opposite side of the hand lever 8 to the first mentioned arm members 5. This arm 10 is likewise hooked at its outer end 11, it being understood that the hooks 6 upon the first mentioned arms are so formed as to engage the top flange of a rim A, and that the hook 11 of the last mentioned arm 10 is so formed as to engage over the bottom flange of said rim, as clearly shown in Figures 1 and 2.

The inner end of the arm 10 as well as the upper ends of the side links 8' are connected to the hand lever 8, through the instrumentality of a link 12, one end of this link 12 being connected to the before mentioned pivot 9, and the upper end thereof adapted for selective connection to the hand lever 8 by a detachable connection 13 engaging through any one of a series of openings 14 in this hand lever, it being understood that this link 12 may be connected to the hand lever 8 through any one of these openings for increasing or decreasing the leverage of the tool.

In the practical use of my device when it is desired to contract the rim *a*, the arms 5—5 and 10 are positioned upon the rim as shown in the full lines of Figure 1. By swinging the hand lever to the right as per the dotted lines of this figure, the rim will be so contracted as to permit of the easy removal of a tire thereof or the positioning of a tire thereon.

Although I have herein shown and described the preferred embodiment of the present invention, it is nevertheless to be understood that minor changes may be made therein, without departing from the spirit and scope of the invention as claimed.

What I claim as new is:—

1. A tire rim tool including a pair of arm members formed with rim engaging hooks at normally opposite ends, a hand lever having one end pivoted to the end of one of the arm members opposite the hooked end, a link pivotally connected to the last mentioned arm member at the pivot with the hand member, the other end of said link having a pivotal connection with the end of the other arm member, and an adjustable link having a pivotal connection with the last mentioned arm member at the connection thereof with the first mentioned link, said adjustable link having an adjustable connection with the hand lever at any one of a plurality of points spaced from the pivot, whereby the links separate the pivots of the arm members from each other and the lever, to provide a means to adjust the leverage of the members in such relation for changing the size of the tool to fit different sized rims, and to hold the pivot separated in contracted relation of the parts in contracting a rim for twisting opposite sides of said rim in relatively opposite relation.

2. A tire rim tool including a hand lever, a pair of arm members having one end pivotally connected at the lower end to said lever, and the opposite end extending in angular relation with each other and formed with rim engaging hooks, a cooperating arm member formed with a rim engaging hook at one end, a link pivotally connected at one end, said link being adapted to be secured in any one of a plurality of positions on the hand lever and spaced from the pivot thereof with said pair of arm members, and a pair of links pivotally connected with the pair of arm members at their pivotal connection with the hand lever, and pivotally connected with the cooperating arm member at its pivotal connection with the first mentioned link, whereby the pairs of links will hold the pivotal connection of the cooperating arm member in spaced relation with the hand lever and said pair of arm members, said links will cooperate with the pair of links for adjusting the size of the tool and the leverage of the hand lever through its adjustable connection therewith, and also holds the arm members in separated position when the hand lever is operated to contract the rim for exerting a relative twisting action on the opposite sides of the rim.

In testimony whereof I affix my signature.

CHARLES H. PEER.